(12) United States Patent
Bergmann

(10) Patent No.: US 6,305,036 B1
(45) Date of Patent: Oct. 23, 2001

(54) PROCESS FOR VARYING A WATER FLOW AMOUNT WHICH IS SUPPLIED TO A BATHING VESSEL OR FITTING AND A VALVE MEANS, ESPECIALLY FOR EXECUTING THIS PROCESS

(75) Inventor: Konrad Bergmann, Schweich (DE)

(73) Assignee: Ideal-Standard GmbH & Co. OHG, Bonn (DE)

( * ) Notice: Subject to any disclaimer, the term of this patent is extended or adjusted under 35 U.S.C. 154(b) by 0 days.

(21) Appl. No.: 09/493,175

(22) Filed: Jan. 28, 2000

(30) Foreign Application Priority Data

Jan. 28, 1999 (DE) ................................................ 199 03 460

(51) Int. Cl.$^7$ ........................................................ A47K 3/00
(52) U.S. Cl. .................................................. 4/541.1; 4/559
(58) Field of Search ................................. 4/541.1, 541.2, 4/559; 700/94

(56) References Cited

FOREIGN PATENT DOCUMENTS

| 656 689 | 7/1986 | (CH) . |
| 0 376 844 | 7/1990 | (EP) . |

OTHER PUBLICATIONS

Patent Abstracts of Japan, C–935, Apr. 30, 1992, vol. 16, No. 180, 4–22318, Matsushita Electric Ind. Co. Ltd., Jan. 27, 1992, English Abstract.
Patent Abstracts of Japan, C–1116, Oct. 4, 1993, vol. 17, No. 547, 5–154066, Jun. 22, 1993, Matsushita Electric Ind. Co. Ltd., English Abstract.

*Primary Examiner*—Robert M. Fetsuga
(74) *Attorney, Agent, or Firm*—Nixon Peabody LLP; David S. Safran

(57) ABSTRACT

The invention relates to a flow controlling arrangement having at least one valve (3, 12) with a valve box (14) and with an adjustable valve gate (15) which is located in the valve box (14), the valve box (14) having a supply (16) and at least one discharge (17, 18), the at least one valve (3, 12) varying the water flow amount supplied from the discharge (17, 18) to a bathing vessel (1), especially a bathtub or a whirlpool, or to a fitting (11). In order to make provide a flow controlling arrangement which has an expanded scope of application for the user, there is an actuator (29) which is connected to the valve gate (15) for resetting the valve gate (15) and a control (9) connected to the actuator (29) which triggers the actuator (29) depending on a tune chosen by the user or according to a preset actuating pulse pattern for setting the valve gate (15). Thus, according to the setting of the valve gate (15), a regular or irregular change of the water flow amount through the discharge (17, 18) arises.

22 Claims, 2 Drawing Sheets

PROCESS FOR VARYING A WATER FLOW AMOUNT WHICH IS SUPPLIED TO A BATHING VESSEL OR FITTING AND A VALVE MEANS, ESPECIALLY FOR EXECUTING THIS PROCESS

BACKGROUND OF THE INVENTION

1. Field of the Invention

The invention relates a process for varying a water flow amount which is supplied to a bathing vessel or a fitting from the discharge of a valve means. The invention relates moreover to a valve means with a valve box and with an adjustable valve gate which is located in the valve box, the valve box having one supply and at least one discharge, there being a valve means for varying the water flow amount supplied from the discharge to a bathing vessel, especially a bathtub or a whirlpool, or to a fitting.

2. Description of Related Art

Known bathtubs and whirlpools are in part equipped with water jet nozzles. While bathing, the bath water is circulated via a pump and is supplied to the bathing area of the bathtub or of the whirlpool via corresponding nozzles. In this way, the user of the bathtub or the whirlpool can be exposed to water jets and massaged underwater. If the user does not want to be exposed to water jets, the pump can be shut down. There is no valve means for influencing the water jet in the bathtub known from practice or the known whirlpool.

In addition, valve means of the initially mentioned type for fittings and bathing vessels are known which are used to vary or change the water flow amount by manual actuation.

SUMMARY OF THE INVENTION

The object of this invention is provide a process and a valve means of the initially mentioned type in which an expanded scope of operation arises for the user.

This object is achieved in a process of the initially mentioned type by, in accordance with the invention, the water flow amount being varied depending on a music tune selected by the user or according to a pattern pre-set by the valve means. In a valve means of the initially mentioned type, to achieve the aforementioned object, it is provided, according to the invention, that there is an actuating means which is connected to the valve gate for resetting the valve gate and that a control means is assigned to the actuating means and triggers the actuating means depending on a tune chosen by the user or according to a preset actuating pulse pattern for setting the valve gate so that, according to the setting of the valve gate, a regular or irregular change of the water flow amount through the discharge arises.

A series of effects which are perceived as pleasant by the user can be achieved by the process according to the invention and by the valve means in accordance with the invention with the assigned actuating means, both when bathing and also when showering. Regular or irregular adjustment of the valve gate can be used to interrupt, for example, the underwater jets in a bathtub or a whirlpool at regular or irregular intervals so that a pleasant massage arises for the user. In conjunction with a fitting, special effects can be achieved, specifically the regular or irregular interruption of the water jet. In this connection, it is perceived as especially pleasant by the user that the water flow amount is influenced depending on a tune selected by the user. In this way, an underwater massage or shower can take place in the rhythm of the music; this is perceived as extremely pleasant by the user when bathing or showering. However, fundamentally, it is also possible to use any other setting pattern of the water flow amount.

It is preferred that the variation of the water flow amount is derived from at least one frequency, the rhythm, the acoustic pressure and/or the loudness of the tune. Structurally, this is done by the control means of the actuating means entering a regular or irregular series of actuating pulses for setting the valve gate which, as noted above, is derived front the frequency, the rhythm, the acoustic pressure and/or the loudness of the tune. It is pointed out solely for clarification that, in a stipulated time interval, for example, one minute, a host of actuating pulses are produced. In any case, the frequency of the actuating pulses prescribed by the control means should be smaller than the frequency of the tune in a certain ratio. Otherwise, however it can also be provided that the amplitude of the individual actuating pulses is in a preset, fixed ratio relative to the acoustic pressure or the loudness of the tune.

It is especially preferred if the frequency of the actuating pulses entered by the control means is derived from the rhythm of the tune, and preferably corresponds to the rhythm of the tune. But basically, it is also possible for the control means of the actuating means to enter a series of actuating pulses with a constant frequency for adjusting the water flow amount. However, in any case, it is advantageous for the pressure of the water flow amount to be dependent on the level of acoustic pressure of the tune.

It is possible for the respective tune to be picked up by the control means via at least one microphone and for the individual actuating pulses with the respective duration and amplitude to then be derived from this tune. However, it is preferred that an audio recording medium player, especially a CD player, is associated with the control means so that the relevant data of the recording medium can be used directly for triggering the actuating means. In this connection, it is especially advantageous for the relevant data, such as the frequencies, loudness, acoustic pressure and/or the rhythm of the tune, of an audio recording medium inserted into the player, to be read and stored before playing. This makes it possible for the actuating means to be triggered in time before the playing of the pertinent stored information; the time displacement of the length of the water line should be from the valve means to the water outlet so that the user perceives the acoustic signal and the corresponding pertinent inflow synchronously.

Furthermore, it is otherwise preferred that a loudness controller be assigned to the control means. Here, it is provided that the control means is coupled to a pump and that the level of the water pressure is dependent on the adjusted loudness. Therefore, as necessary, the user can also increase the pressure of the supplied water depending on the adjusted loudness. In any case, it should also be provided that the aforementioned function can be turned off, that therefore the control of the loudness can also be independent of the level of the water pressure.

Basically, it is possible to embody the valve means in accordance with the invention such that, in the valve box, there are only a single supply and a single discharge, and that the valve gate provided in the valve box changes the flow opening through the valve means depending on the control pulses entered by the control means. But, it is problematic that, when the water flow amount changes continuously, the pump must react accordingly.

Therefore, in one especially preferred embodiment, it is provided that the valve box has at least two discharges, that the valve gate is made such that, when the valve gate is set in one direction, the flow opening to one discharge is reduced in size, and at the same time, the flow opening to the other discharge is enlarged to the same degree, and that, when the valve gate is set in the other direction, the flow opening to the other discharge is reduced in size, and at the same time, the flow opening to the one discharge is enlarged to the same degree. In this embodiment of the valve means, the same flow amount of water is always delivered via the assigned pump. The valve means in accordance with the invention is then a so-called reversing valve. The two discharges thus pass into water lines which, in conjunction with a bathing vessel, for example, discharge into the bathing vessel on opposite sides. However, it is also possible to route one of the discharges directly back into the pump circuit without the discharge being directly connected to the bathing vessel.

The valve means in accordance with the invention can also be easily used in conjunction with a shower. The shower head in this case is then supplied by two water lines which are connected to the two discharges. Preferably, the water coming from one discharge then emerges, for example, on an outer area and the water coming from the other discharge emerges over a middle area of the shower head, it being ensured that the same amount of water always emerges via the shower head.

It is otherwise preferred that the valve gate is spring-loaded such that, at rest, it remains in the middle position in which the flow openings to the two discharges are roughly the same size. This ensures that, when the valve gate is not set via the actuating means, exactly the same amount of water flows out of the two discharges.

Structurally, the special type of valve means in accordance with the invention, which is made as a reversing valve, can be built by making the valve gate tubular so that the water supplied via the supply can pass through the valve gate in the lengthwise direction and can easily emerge both at one and also the other discharge.

Otherwise, the valve gate is also pressure compensated so that any pressure surges do not adversely affect the respective water flow amount.

In terms of handling, it is otherwise especially favorable when the actuating means is located in the valve box so that a unit which is easy to handle results.

Finally, this invention also relates to a bathing vessel, especially a bathtub or a whirlpool, with at least one pump for circulating the bath water and with a valve means of the aforementioned type which is connected to the pump. Furthermore, the invention relates to a fitting with a valve means of the indicated type.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
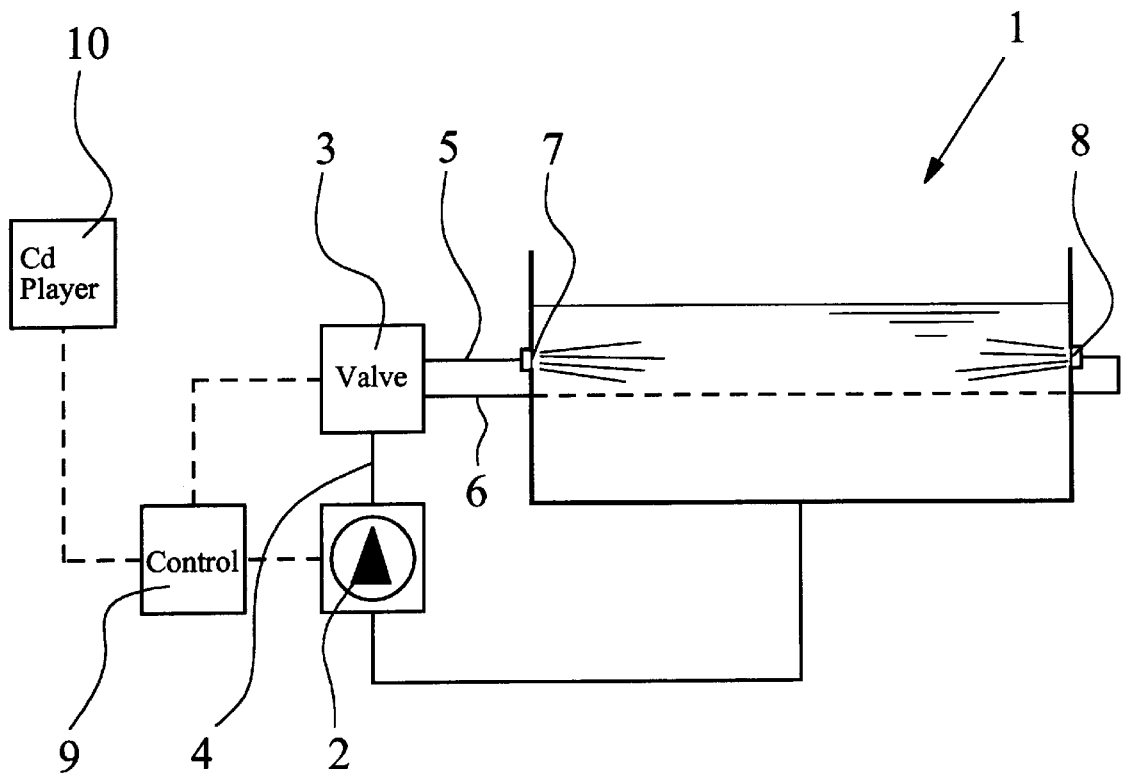
FIG. 1 is a schematic representation of a bathing vessel in accordance with the invention.

FIG. 1 shows a bathing vessel 1 which can be a bathtub or a whirlpool. The bathing vessel 1 has a pump 2 for circulating bath water. In the pump circuit, on the pressure side between the bathing vessel 1 and the pump 2, there is a valve means 3. The valve means 3 is connected on the input side via a water line 4 to the pump 2, while on the output side it is connected via two water lines 5, 6 to the bathing vessel 1.

Here, the water lines 5, 6 pass via the corresponding nozzles 7, 8 into the bathing vessel 1. The valve means 3 and the pump 2 are electrically connected to a control means 9 to which, in turn, a CD player 10 is electrically connected.

Figure 2:
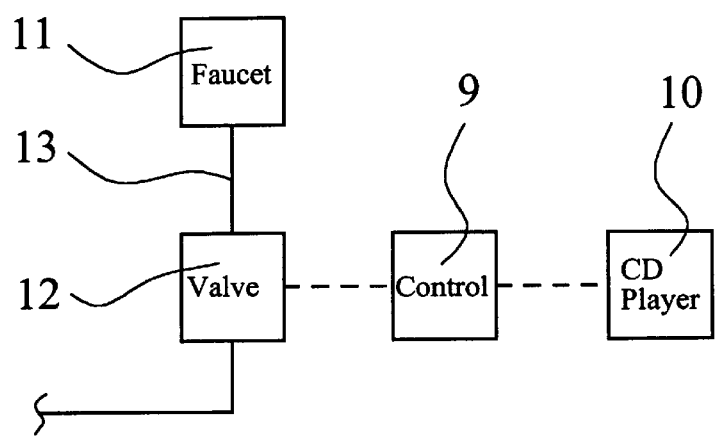
FIG. 2 schematically depicts a fitting according to the invention.

FIG. 2 shows a schematic of a fitting 11 to which likewise a valve means 12 is connected. Here the fitting 11 is a shower fitting. The valve means 12 is interposed in the water line 13 which leads to the fitting 11. It should be pointed out that the water line 13 is a mixing water line. The valve means 12 is located, therefore, at a site where the cold and hot water are already mixed. A control means 9 and a CD player 10 are electrically connected, in turn, to the valve means 12.

Figure 3:
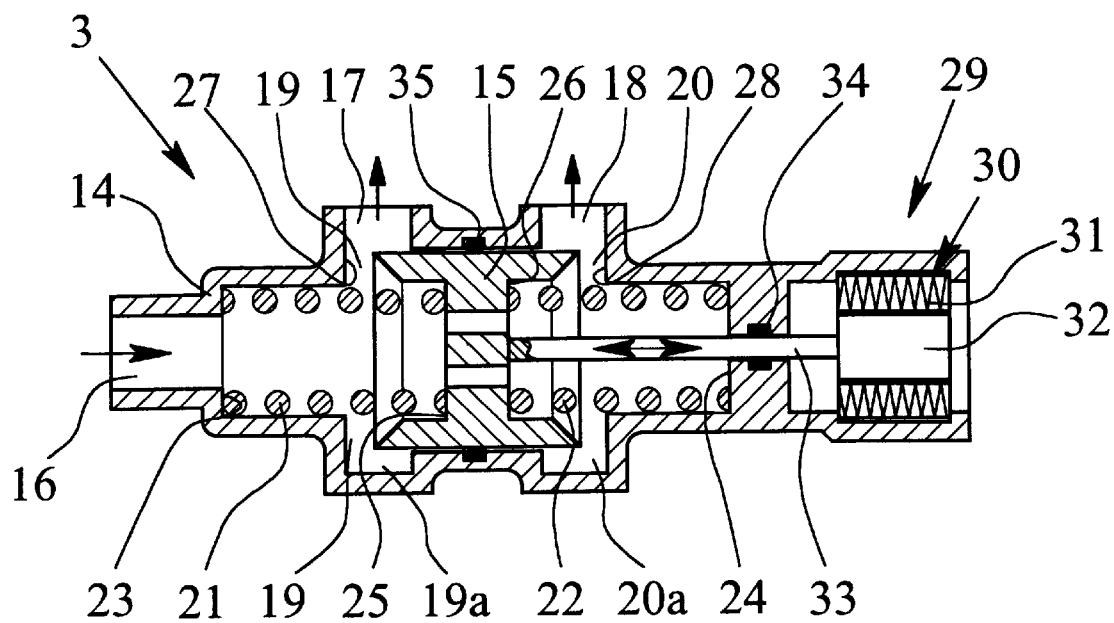
FIG. 3 shows a cross-sectional view of a valve means in accordance with the invention.

FIG. 3 depicts a valve means 3 of the bathing vessel 1 which is shown in FIG. 1. The valve means 3, here, has a valve box 14 and an adjustable valve gate 15 which is located in the valve box 14. The valve box 14 has a single supply 16 for connection to the water line 4 and two discharges 17, 18, for connection to the water lines 5, 6. It should be pointed out that, in the area of each individual discharge 17, 18, there can also, fundamentally, be a plurality of other discharges.

Figure 4:
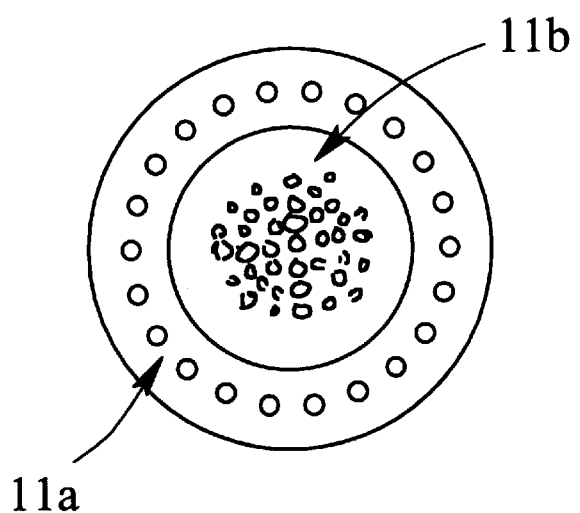
FIG. 4 shows a shower head having an outer annular outlet area and a separate inner outlet area.

Conversely, the valve means 12 in the embodiment as shown in FIG. 2, likewise, has one supply, but only a single discharge. However, in this case, it is also possible to use the valve means 3 which is shown in FIG. 3 in combination with a shower, and then corresponding to the two discharges in the shower head, there should be two separate outlet areas, preferably an annular outlet area 11a and an inner outlet area 11b, as depicted in FIG. 4.

In the embodiment shown in FIG. 3, it is important that the valve gate 15 be made such that, when it is set in one direction, here for example, to the left, the flow opening 19 to one discharge 17 is reduced in size, and at the same time, the flow opening 20 to the other discharge 18 is enlarged, to the same degree as the flow opening 19 is made smaller. The corresponding applies when the valve gate 15 is set in the other direction. The flow openings 19, 20 themselves pass into annular channels 19a, 20a.

The valve gate 15, here, is spring-loaded such that, at rest, it remains in the middle position in which the flow openings 19, 20 to discharges 17, 18 are roughly the same size. For this purpose, two spring elements, which are made as helical compression springs 21, 22 which are supported on the corresponding stops 23, 24 in the valve gate 14 and on the stops 25, 26 on the valve gate 15. The valve gate 15 is made tubular so that the water supplied via the supply 16 can pass through the valve gate 15 in the lengthwise direction. Here, the valve ate 15 is smaller than the distance of the outer control edges 27, 28 on the valve box 14. The valve gate 15 can therefore be moved back and forth between the control edges 27, 28.

Basically, it is also possible for the valve gate to be longer than the distance of the control edges on the valve box. In this case, the valve gate has end areas on its outer ends which project in the radial direction and which then extend over the respective control edges. It should otherwise also be pointed out that it is fundamentally possible to have more than two discharges.

They are then provided in the valve box between the two outer discharges. Corresponding to tile other discharges there are then corresponding openings in the wall of the valve gate. The flow openings to the other discharges can thus be offset to the flow openings of the outer discharges.

Otherwise, the valve gate 15 is at least essentially pressure compensated, therefore it has an essentially symmetrical shape. In this case, the valve means 3 has a actuating means 29 which is permanently connected to the valve gate 15 for setting the latter. The actuating means 29 of the valve means 3 is coupled to the control means 9 which is shown in FIG. 1. The actuating means 29 is located here in the valve box 14 and has an electromagnetic servo-drive 30 with a coil. The coil has a winding 31 and a magnetic armature 32 which is permanently connected via a connecting rod 33 to the valve gate 15. Leaks to the servo drive 30 are prevented via a sealing element 34 which is located around the connecting rod 33 and which is held in the valve box 14. Otherwise, channels 19a, 20a or discharges 17, 18 are, of course, scaled relative to one another via a sealing element 35 in order to preclude short circuit flows.

If water is supplied to the bathing vessel 1 which is shown in FIG. 1 via the nozzles 7, 8 without the valve gate 15 having been set by the actuating means 29, the same amount of water is supplied via the nozzles 7, 8 since the valve gate 15 is in its rest position. This changes when the actuating means 29 is triggered by the control means 9 depending on a tune chosen by the user or according to a preset actuating pulse pattern.

Here, the control means 9 generates control pulses which correspond to the rhythm of the tune. According to the control pulse, the actuating means 29 is excited. In doing so, the coil acquires either a positive or a negative control pulse so that the armature moves in one direction or the other, and in doing, so sets the valve gate 15 accordingly. Otherwise, it is such that the water pressure is also increased depending on the level of the acoustic pressure. To do this, the control means 9 triggers the pump 2 accordingly.

A series of effects which are perceived as pleasant by the user can be achieved by the process according to the invention and by the valve means 3 in accordance with the invention with the assigned actuating means 29, both when bathing and also when showering. Regular or irregular adjustment of the valve gate can be used to interrupt, for example, the underwater jets in a bathtub or a whirlpool at regular or irregular intervals so that a pleasant massage arises for the user. In conjunction with the fitting 11, special effects can be achieved, specifically the regular or irregular interruption of the water jet. In this connection, it is perceived as especially pleasant by the user that the water flow amount is influenced depending on a tune selected by the user. In this way, an underwater massage or shower can take place in the rhythm of the music; this is perceived as extremely pleasant by the user when bathing or showering. However, fundamentally, it is also possible to use ally other setting pattern of the water flow amount.

It is preferred that the variation of the water flow amount is derived from at least one frequency, the rhythm, the acoustic pressure and/or the loudness of the tune. Structurally, this is done by the control means 9 of the actuating means entering a regular or irregular series of actuating pulses for setting the valve gate which, as noted above, is derived from the frequency, the rhythm, the acoustic pressure and/or the loudness of the tune. It is pointed out solely for clarification that, in a stipulated time interval, for example, one minute, a host of actuating pulses are produced. In any case, the frequency of the actuating pulses prescribed by the control means 9 should be smaller than the frequency of the tune in a certain ratio. Otherwise, however, it can also be provided that the amplitude of the individual actuating pulses is in a preset, fixed ratio relative to the acoustic pressure or the loudness of the tune.

It is especially preferred if the frequency of the actuating pulses entered by the control means 9 is derived from the rhythm of the tune, and preferably corresponds to the rhythm of the tune. But basically, it is also possible for the control means 9 of the actuating means 29 to enter a series of actuating pulses with a constant frequency for adjusting the water flow amount. However, in any case, it is advantageous for the pressure of the water flow amount to be dependent on the level of acoustic pressure of the tune.

It is possible for the respective tune to be picked up by the control means via at least one microphone and for the individual actuating pulses with the respective duration and amplitude to then be derived from this tune. However, it is preferred that an audio recording medium player, especially CD player 10, is associated with the control means 9 so that the relevant data of the recording medium can be used directly for triggering the actuating means. In this connection, it is especially advantageous for the relevant data, such as the frequencies, loudness, acoustic pressure and/or the rhythm of the tune, of an audio recording medium inserted into the player 10, to be read and stored before playing. This makes it possible for the actuating means to be triggered in time before the playing of the pertinent stored information; the time displacement of the length of the water line 4 should be from the valve means 3 to the water outlet (nozzles 7, 8) so that the user perceives the acoustic signal and the corresponding pertinent inflow synchronously.

Furthermore, it is otherwise preferred that a loudness controller be assigned to the control means 9. Here, it is provided that the control means 9 is coupled to the pump 2 and that the level of the water pressure is dependent on the adjusted loudness. Therefore, as necessary, the user can also increase the pressure of the supplied water depending on the adjusted loudness. In any case, it should also be provided that the aforementioned function can be turned off, that therefore the control of the loudness can also be independent of the level of the water pressure.

Otherwise, the control mens 29, and optionally the pump 2, are triggered via the control means 9 such that the valve gate 15 is already set before the respective part of the tune is played so that the change of the water jet emerging from the nozzles 7, 8 is perceived by the user as synchronous with the acoustically corresponding signal.

In the embodiment shown in FIG. 2, the valve means 12 is not made for reversal. With the valve means 12 in the embodiment shown in FIG. 2, the water flow amount can also be changed. At the same time, however, it is also possible to block the water line 13; this is not possible in the valve means 3 shown in FIG. 3.

What is claim is:

1. Flow controlling arrangement for varying a water flow amount which is supplied to at least one of a bathing vessel and a water discharge fitting comprising valve means for varying the water flow amount and control means for operating said valve means, said control means controlling the valve means responsive to one of a tune selected by a user and a preset pattern, wherein said valve means comprises a valve box and an adjustable valve gate which is located in the valve box, the valve box having a supply and at least two discharges and means for varying the water flow amount supplied from the discharge to a bathing vessel; wherein an actuating means is connected to the valve gate for resetting the valve gate; and wherein the control means connected to the actuating means and triggers the actuating means depending on said one a tune chosen by the user and a preset actuating pulse pattern for setting the valve gate so that, according to the setting of the valve gate, a change of the water flow amount through the discharge arises.

2. Flow controlling arrangement as claimed in claim 1, wherein the control means enters series of actuating pulses for setting the valve gate derived from at least one of a frequency, rhythm, acoustic pressure loudness of a tune selected by the user.

3. Flow controlling arrangement as claimed in claim 2, wherein the control means produces actuating pulses having a frequency which is smaller than a frequency of the tune in a defined ratio.

4. Flow controlling arrangement as claimed in claim 3, wherein the control means produces actuating pulses having an amplitude in a defined ratio relative to one of the acoustic pressure and loudness of the tune.

5. Flow controlling arrangement as claimed in claim 2, wherein the control means produces actuating pulses having an amplitude in a defined ratio relative to one of the acoustic pressure and loudness of the tune.

6. Flow controlling arrangement as claimed in claim 1, wherein an audio recording medium player is connected to the control means; and wherein at least one of frequencies, loudness, acoustic pressure and the rhythm of a tune of an audio recording medium inserted into the player is read and stored by the control means before playing of the tune.

7. Flow controlling arrangement as claimed in claim 6, wherein actuating means is triggered in time displacement before the playing of stored information, the time displacement corresponding to a time required for appropriate adjustment of the water flow.

8. Flow controlling arrangement according to claim 7, where said time displacement is adjustable.

9. Flow controlling arrangement as claimed in claim 1, wherein a loudness controller connected to the control means; wherein the control means is coupled to a pump; and wherein a water pressure level produced by the pump is controlled in dependence on the adjusted loudness.

10. Flow controlling arrangement according to claim 1, wherein said valve means comprises a valve box and an adjustable valve gate which is located in the valve box, the valve box having a supply and at least two discharges, and means for varying the water flow amount supplied from the at least one discharge to a bathing vessel; wherein the valve gate has one setting direction in which a flow opening to first of the discharges is reduced, and at the same time, a flow opening to a second of the discharges is enlarged to the same degree; and wherein the valve gate has a second setting direction in which the flow opening to the second discharge is reduced, and at the same time, the flow opening to the first discharge is enlarged to the same degree.

11. Flow controlling arrangement as claimed in claim 10, wherein an actuating means is connected to the valve gate for resetting the valve gate.

12. Flow controlling arrangement as claimed in claim 10, wherein the valve gate is spring-loaded into central rest position in which the flow openings to the discharges are roughly the same size.

13. Flow controlling arrangement as claimed in claim 10, wherein the valve gate is tubular; and wherein the valve gate located in the valve box pressure compensated.

14. Flow controlling arrangement as claimed in claim 10, wherein the actuating means is located in the valve box; and wherein the actuating means has an electromagnetic servo-drive.

15. Process for varying a water flow amount which is supplied to at least one of a bathing vessel and a water discharge fitting from a discharge of a valve means by controlling the valve means for varying the water flow amount based upon one of a tune selected by a user and a preset pattern, wherein the water flow amount is provided with a pressure which is dependent on the level of acoustic pressure of the tune.

16. Process as claimed in claim 15, wherein said controlling of the water flow amount is derived from the valve means being responsive to at least one of a frequency, rhythm, acoustic pressure and loudness of the tune.

17. Process as claimed in claim 16, wherein the water flow amount is varied with a frequency which corresponds to the rhythm of the tune.

18. Bathing vessel at least one pump for circulating bath water and at least one valve means connected to the pump and control means for operating said at least one valve means, said control means controlling the valve means responsive to one of a tune selected by a user and a preset pattern; wherein said valve means comprises a valve box and an adjustable valve gate which is located in the valve box, the valve box having a supply and at least two discharges, and means for varying the water flow amount supplied from the at least one discharge to a bathing vessel; wherein the valve gate has one setting direction in which a flow opening to first of the discharges is reduced, and at the same time, a flow opening to a second of the discharges is enlarged to the same degree; and wherein the valve gate has a second setting direction in which the flow opening to the second discharge is reduced, and at the same time, the flow opening to the first discharge is enlarged to the same degree.

19. Fitting with a valve means and control means for operating said at least one valve means, said control means controlling the valve means responsive to one of a tune selected by a user and a preset pattern; wherein said valve means comprises a valve box and an adjustable valve gate which is located in the valve box, the valve box having a supply and at least two discharges, and means for varying the water flow amount supplied from the at least one discharge to a bathing vessel; wherein the valve gate has one setting direction in which a flow opening to first of the discharges is reduced, and at the same time, a flow opening to a second of the discharges is enlarged to the same degree; and wherein the valve gate has a second setting direction in which the flow opening to the second discharge is reduced, and at the same time, the flow opening to the first discharge is enlarged to the same degree.

20. Fitting according to claim 19, wherein said fitting is a shower head having an outer area of spray openings and a separated in area with spray openings.

21. Flow controlling arrangement for varying a water flow amount which is supplied to at least one of a bathing vessel and a water discharge fitting comprising valve means for varying the water flow amount and control means for operating said valve means, said control means controlling the valve means responsive to one of a tune selected by a user and a preset pattern, wherein a loudness controller is connected to the control means;

wherein the control means is coupled to a pump; and wherein a water pressure level produced by the pump is controlled in dependence on the adjusted loudness.

22. Flow controlling arrangement for varying a water flow amount which is supplied to at least one of a bathing vessel and a water discharge fitting comprising valve means for varying the water flow amount and control means for operating said valve means, said control means controlling the valve means responsive to one of a tune selected by a user and a preset pattern wherein said valve means comprises a valve box and an adjustable valve gate which is located in the valve box, the valve box having a supply and at least two discharges, and means for varying the water flow amount supplied from the at least one discharge to a bathing vessel;

wherein the valve gate has one setting direction in which a flow opening to first of the discharges is reduced, and at the same time, a flow opening to a second of the discharges is enlarged to the same degree; and wherein the valve gate has a second setting direction in which the flow opening to the second discharge is reduced, and at the same time, the flow opening to the first discharge is enlarged to the same degree.

* * * * *